(12) United States Patent
Paras Ram et al.

(10) Patent No.: US 12,579,245 B2
(45) Date of Patent: Mar. 17, 2026

(54) DEVICE, METHOD AND SYSTEM FOR CONTROLLING ACCESS CONTROL POINTS

(71) Applicant: MOTOROLA SOLUTIONS, INC., Chicago, IL (US)

(72) Inventors: Anoop Sehgal Paras Ram, Ipoh (MY); Logesvary Poo Gopalasamy, Sungai Petani (MY); Qi Wei Yeoh, Bukit Mertajam (MY); Chun Wen Ooi, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 107 days.

(21) Appl. No.: 18/804,374

(22) Filed: Aug. 14, 2024

(65) Prior Publication Data

US 2026/0050657 A1    Feb. 19, 2026

(51) Int. Cl.
*G06F 21/32* (2013.01)
*G06V 20/52* (2022.01)

(52) U.S. Cl.
CPC .............. *G06F 21/32* (2013.01); *G06V 20/52* (2022.01); *G06F 2221/2141* (2013.01); *G06V 2201/07* (2022.01)

(58) Field of Classification Search
CPC ......................... G06F 21/32; G06F 2221/2141
USPC ........................................................ 713/186
See application file for complete search history.

(56) References Cited

U.S. PATENT DOCUMENTS

| | | | |
|---|---|---|---|
| 7,644,086 B2 | 1/2010 | Boozer et al. | |
| 8,819,851 B1 | 8/2014 | Johansson | |
| 10,783,727 B2 | 9/2020 | Zavesky et al. | |
| 12,450,582 B2 * | 10/2025 | Dunjic | G06Q 20/202 |
| 2005/0033962 A1 * | 2/2005 | Libin | H04L 9/3247 |
| | | | 713/170 |
| 2012/0169880 A1 | 7/2012 | Williamson | |
| 2017/0295181 A1 | 10/2017 | Parimi et al. | |
| 2022/0360589 A1 * | 11/2022 | Muscariello | H04L 9/0836 |
| 2024/0071159 A1 | 2/2024 | Czernomysa et al. | |
| 2024/0249148 A1 | 7/2024 | Pak et al. | |
| 2024/0386766 A1 * | 11/2024 | Shenoi | G06V 20/41 |

* cited by examiner

*Primary Examiner* — Anthony D Brown
(74) *Attorney, Agent, or Firm* — PERRY + CURRIER INC. (FOR MSI)

(57) ABSTRACT

A computing device receives, from a first access control point, valid user credentials associated with a first user, and responsively controls the first access control point to allow entry therethrough. The device: receives, from one or more cameras, images depicting the first user, a second user, and a plurality of objects; and determines, using one or more analytics algorithms applied to the images, that the first user is transporting a first object of the objects, and that the objects are detectably associated. The device: determines, using the analytics algorithms applied to the images, that the second user is transporting a second object of the objects, and that the second user is at or is approaching the first access control point; and responsively controls the first access control point to allow entry therethrough for the second user based on extended application of the valid user credentials to the second user.

20 Claims, 7 Drawing Sheets

300

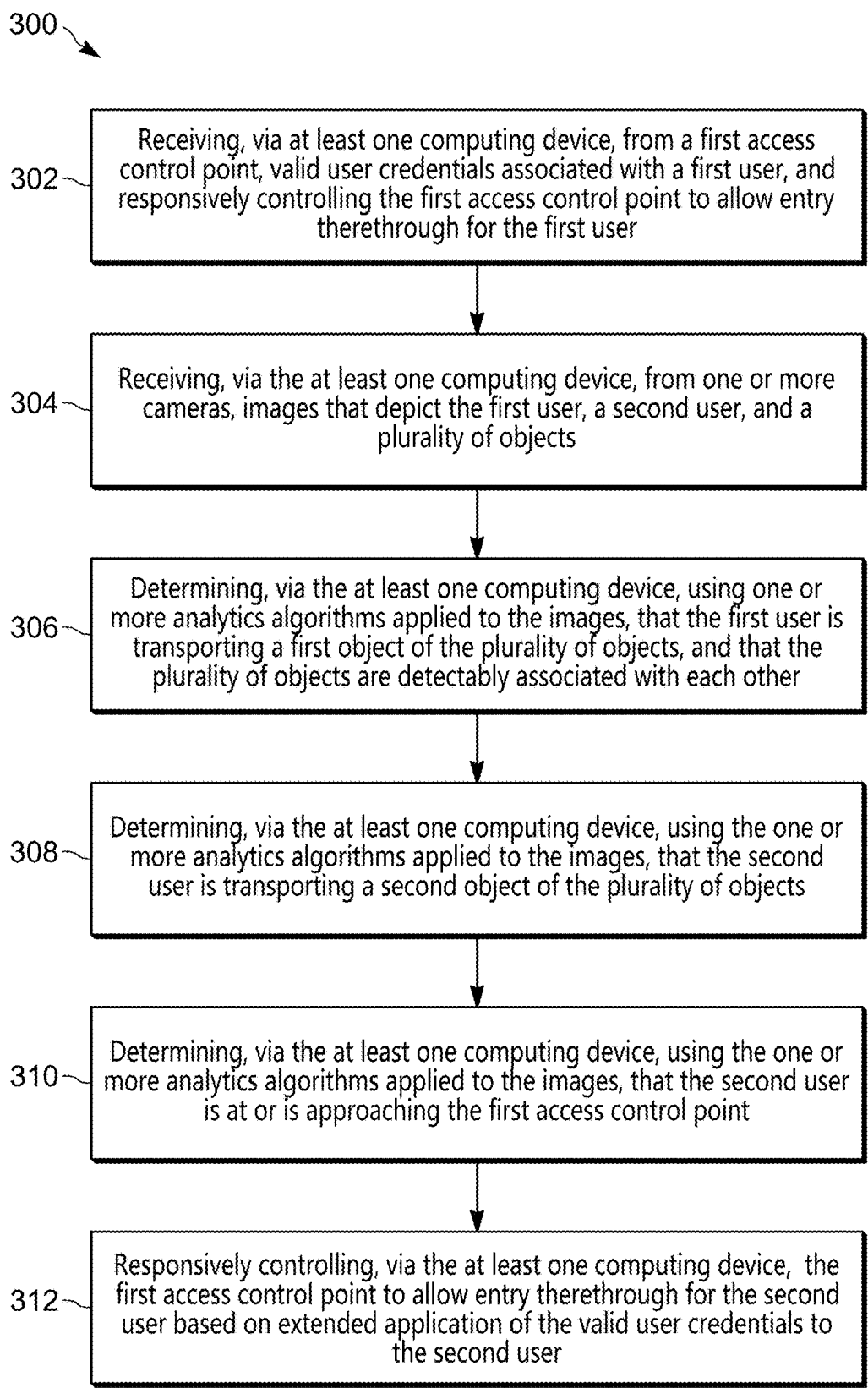

302 — Receiving, via at least one computing device, from a first access control point, valid user credentials associated with a first user, and responsively controlling the first access control point to allow entry therethrough for the first user 304 — Receiving, via the at least one computing device, from one or more cameras, images that depict the first user, a second user, and a plurality of objects 306 — Determining, via the at least one computing device, using one or more analytics algorithms applied to the images, that the first user is transporting a first object of the plurality of objects, and that the plurality of objects are detectably associated with each other 308 — Determining, via the at least one computing device, using the one or more analytics algorithms applied to the images, that the second user is transporting a second object of the plurality of objects 310 — Determining, via the at least one computing device, using the one or more analytics algorithms applied to the images, that the second user is at or is approaching the first access control point 312 — Responsively controlling, via the at least one computing device, the first access control point to allow entry therethrough for the second user based on extended application of the valid user credentials to the second user

FIG. 3

DEVICE, METHOD AND SYSTEM FOR CONTROLLING ACCESS CONTROL POINTS

BACKGROUND OF THE INVENTION

Entry to buildings, areas of the buildings, and the like, may be controlled via access control points at which credentials may need to be presented, for example in the form of an access card, and/or fingerprints, and the like, presented to respective card readers and/or fingerprint readers, and the like, at the access control points, before the access control points may be unlocked and/or opened.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 is a flowchart of a method for controlling access control points, in accordance with some examples.

Figure 1:
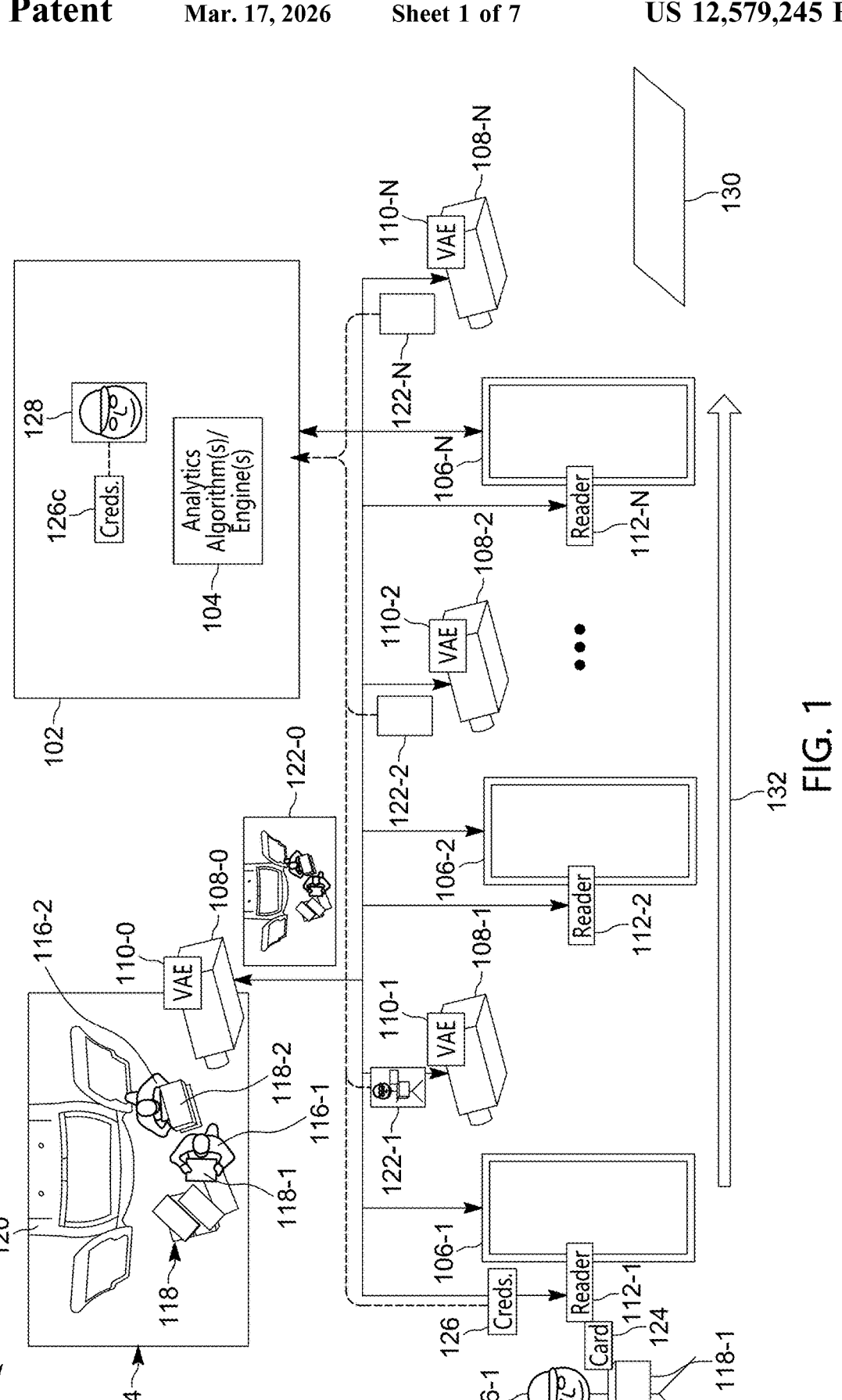
FIG. 1 is a system for controlling access control points, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Repeated entering into a building, and the like, where access is controlled, and the like, and/or repeated entering of multiple areas in the building where access is controlled may be inefficient due to repeated processing of the credentials as they are presented at the access control points. Such a process may be rendered even more cumbersome when there are multiple users transporting objects into a building and/or through areas of the building at which access is controlled, as each user must present credentials before gaining entry to the access control points again leading to repeated processing. Thus, there exists a need for an improved technical method, device, and system for controlling access control points.

An aspect of the present specification provides a method comprising: receiving, via at least one computing device, from a first access control point, valid user credentials associated with a first user, and responsively controlling the first access control point to allow entry therethrough for the first user; receiving, via the at least one computing device, from one or more cameras, images that depict the first user, a second user, and a plurality of objects; determining, via the at least one computing device, using one or more analytics algorithms applied to the images, that the first user is transporting a first object of the plurality of objects, and that the plurality of objects are detectably associated with each other; determining, via the at least one computing device, using the one or more analytics algorithms applied to the images, that the second user is transporting a second object of the plurality of objects; determining, via the at least one computing device, using the one or more analytics algorithms applied to the images, that the second user is at or is approaching the first access control point; and responsively controlling, via the at least one computing device, the first access control point to allow entry therethrough for the second user based on extended application of the valid user credentials to the second user.

An aspect of the present specification provides a device comprising: a controller; and a computer-readable storage medium having stored thereon program instructions that, when executed by the controller, causes the controller to perform a set of operations comprising: receiving, from a first access control point, valid user credentials associated with a first user, and responsively controlling the first access control point to allow entry therethrough for the first user; receiving, from one or more cameras, images that depict the first user, a second user, and a plurality of objects; determining, using one or more analytics algorithms applied to the images, that the first user is transporting a first object of the plurality of objects, and that the plurality of objects are detectably associated with each other; determining, using the one or more analytics algorithms applied to the images, that the second user is transporting a second object of the plurality of objects; determining, using the one or more analytics algorithms applied to the images, that the second user is at or is approaching the first access control point; and responsively controlling the first access control point to allow entry therethrough for the second user based on extended application of the valid user credentials to the second user.

Each of the above-mentioned embodiments will be discussed in more detail below, starting with example system and device architectures of the system in which the embodiments may be practiced, followed by an illustration of processing blocks for achieving an improved technical method, device, and system for controlling access control points.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for controlling access control points. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like, unless otherwise indicated. However, to distinguish between flow of data and communication links between components in the present specification, the communication links are depicted as solid lines, while flow of data is depicted in broken lines.

The system 100 comprises at least one computing device 102 that may implement one or more analytics algorithms 104, which, for example as depicted, may be in the form of one or more analysis engines. The at least one computing device 102 is interchangeably referred to hereafter as the computing device 102.

The computing device 102 is communicatively coupled to a plurality of access control points 106-1, 106-2 . . . 106-N, interchangeably referred to hereafter, collectively, as the access control points 106 and, generically, as an access control point 106. This convention will be used throughout the present specification. While the access control points 106 are depicted as doors herein, the access control points 106 may have any suitable configuration, and may include, but are not limited to, the depicted doors, gates, swinging gates, elevator doors, and the like, amongst other possibilities. Indeed, the access control points 106 may have any suitable configuration that prevents access therethrough by users unless certain conditions are met, as described herein. For example, while not depicted, the access control points 106 may comprise respective locking mechanisms and/or respective opening mechanisms, that may be controlled via commands from the computing device 102 to cause the respective locking mechanisms and/or respective opening mechanisms to unlock and/or open. Herein, an access control point 106 being locked and/or closed is represented by two respective rectangles, with a smaller rectangle nested within a larger rectangle; also herein, an access control point 106 being unlocked and/or open is represented by one respective larger rectangle, with the smaller rectangle being omitted (e.g., see FIG. 4). Hence, in FIG. 1, it is understood that all the access control points 106 are locked and/or closed.

The access control points 106 may be located at, or within, a same building or facility, and the like, or located at, or within, any suitable location. For example, the first access control point 106-1 may be an entrance, and/or a delivery entrance, to a building. Furthermore, while for simplicity the access control points 106 are depicted in a line and/or on a same level, the access control points 106 may be arranged in any suitable manner, and may be at different floors of a building, and the like, and access to the different floors may be via stairwells and/or elevators, and the like.

Furthermore, a number "N" of the access control points 106 may be as few as one access control point 106 (e.g., a first access control point 106-1), but may be any suitable number of access control points 106, such as two access control points 106 (e.g., the first access control point 106-1 and a second access control point 106-2), three access control points 106, ten access control points 106, or higher, amongst other possibilities. Indeed, an ellipsis between the second access control point 106-2 and the Nth access control point 106-N represents the system 100 comprising any suitable number of access control points 106-N that may be greater than the three depicted access control points 106.

The computing device 102 is further communicatively coupled to a plurality of cameras 108-0, 108-1, 108-2 . . . 108-N (e.g., the cameras 108 and/or a camera 108), and each access control point 106 may, as depicted, be associated with a respective camera 108. The cameras 108 may comprise any suitable video cameras and/or still image cameras, and the like, and are understood to acquire respective (e.g., analog or digital) images (described in more detail below) and provide such images to the computing device 102. Indeed, while herein the "images" are described as being acquired by the cameras 108, the cameras 108 may acquire such images in the form of video and/or streaming video.

Hence, the term image and video may be used interchangeably. The camera 108 may comprise closed circuit television (e.g., CCTV) cameras, however the camera 108 may comprise any suitable types of camera that acquires images in any suitable format.

As depicted, the camera 108 may implement, via respective processing resources, respective video analytics engines (VAEs) 110-0, 110-1, 110-2 . . . 110-N (e.g., the VAEs 110 and/or a VAE 110). The VAEs 110 may comprise respective software engines that analyzes images acquired by a respective camera 108, and may be generally configured to "watch" the images and detect pre-selected subjects such as users, objects, and the like. The VAEs 110 may also be configured to detect certain actions of users, such as users transporting objects, and/or other types of action depicted in images as described herein. The VAEs 110 may also be configured to detect whether users are associated, whether objects are associated, and/or other types of associations depicted in images as described herein. In some of these examples, the VAEs 110 may add indications of detected users and/or detected objects, and/or detected actions and/or detected associations to metadata of respective images at which such users and/or objects and/or actions and/or associations are detected.

Indeed, the one or more analytics algorithms 104 may have similar functionality as the VAEs 110, such that the one or more analytics algorithms 104 may comprise one or more video analytics algorithms and/or engines. Alternatively, or in addition, the one or more analytics algorithms 104 may comprise metadata analytics algorithms which process metadata of images from the cameras 108 that have been added to the images via the VAEs 110.

The computing device 102 is further communicatively coupled to plurality of credential readers 112-1, 112-2 . . . 112-N (e.g., the readers 112 and/or a reader 112). The readers 112 are understood to be configured to read user credentials associated with users in any suitable manner. For example, as described herein, the readers 112 may be configured to wirelessly read user credentials from access cards, as described herein, with copies of such user credentials being preconfigured (e.g., stored) at the computing device 102.

However, the readers 112 may comprise any suitable readers including, but not limited to, fingerprint readers, and the like, such that user credentials provided to the readers 112 may be in form of read and/or scanned fingerprints, with copies of such read and/or scanned fingerprints being preconfigured (e.g., stored) at the computing device 102. It is understood that while the terms "scanned fingerprints", and "copies of the scanned fingerprints", and the like, are used herein, such scanned fingerprints, and/or copies of the scanned fingerprints may be in form of fingerprint data that defines the scanned fingerprints, and the like, that records unique characteristics extracted from scanned fingerprints; such fingerprint data may include, but is not limited to, indications of minutiae points representing discontinuities in a ridge map of a fingerprint.

However any suitable biometric identification data may be used for user credentials as described herein.

For example, functionality of the readers 112 may be combined with the cameras 108 such that user credentials provided to the readers 112 may be in form of images of users, with copies of images of the users being preconfigured (e.g., stored) at the computing device 102. In this example, one or more of the readers 112 may not be present in the system 100, but rather functionality of acquiring user credentials may occur via one or more of the cameras 108. It is understood that while the terms "images", and "copies of the images", and the like, are used herein, with respect to the user credentials, such images, and/or copies of the images may be in form of faceprint data that defines a face in an image, and the like, that records unique characteristics extracted from a face in an image; such faceprint data may include, but is not limited vectors representing a face in an image.

However, in other examples, the readers 112 may comprise facial scanners and/or readers that may comprise dedicated cameras (e.g., which may be different from the cameras 108), such that user credentials provided to the readers 112 may be in form of images of faces of users, with copies of images of faces of the users being preconfigured (e.g., stored) at the computing device 102. Again, faceprint data may be used in place of images of faces.

However, it is understood that any suitable biometric identification data may be used in the present specification as user credentials, including, but not limited to, the aforementioned fingerprints and/or fingerprint data, the aforementioned images of faces and/or faceprint data, gait data, eye and/or iris data, retina data, voice recognition data, vein recognition data, DNA data, and the like, amongst other possibilities. Hence, a reader 112 may include, but is not limited to, an access card reader, a fingerprint reader and/or scanner, a gait reader, an eye and/or iris reader and/or scanner, a retina reader and/or scanner, a voice reader, a vein reader and/or scanner, a DNA reader (e.g. from a biological sample provided by a user 116, and the like), and the like.

As depicted, a first access control point 106-1 is associated with a first camera 108-1, a first VAE 110-1, and a first reader 112-1, a second access control point 106-2 is associated with a second camera 108-2, a second VAE 110-2, and a second reader 112-2, and a last access control point 106-N is associated with an $N^{th}$ camera 108-N, an $N^{th}$ VAE 110-N, and an $N^{th}$ reader 112-N.

However, not all of the cameras 108 need to be associated with a respective access control point 106. For example, a "zeroth" camera 108-0 may be mounted to acquire images of a loading and/or unloading area 114. For example, as depicted a first user 116-1 and a second user 116-2 (e.g., the users 116 and/or a user 116) are unloading a plurality of objects 118, for example from a van 120, and the zeroth camera 108-0 is acquiring images 122-0 of the users 116, as well as the objects 118. For example, the users 116 may be delivering the objects 118 to a building that includes the access control points 106.

As depicted, the first user 116-1 is transporting a first object 118-1 of the plurality of objects 118, and the second user 116-2 is transporting a second object 118-2 of the plurality of objects 118. While as depicted transporting of the objects 118 occurs via the users 116 carrying respective objects 118, one object 118 at a time, in other examples, the users 116 may transport more than one object 118 at a time and/or the users 116 may transport one or more objects 118 via a dolly, and/or cart, and the like.

Alternatively, the zeroth camera 108 may not be present in the system 100, and the first camera 108-1 may be positioned to acquire images of the area 114, as well as a region adjacent the first access control point 106-1 that includes the first reader 112-1.

Furthermore, cameras 108 associated with access control points 106 are understood to be mounted in respective positions where the cameras 108 acquire images 122-1, 122-2 . . . 122-N of an area in front of respective outer sides of the access control points 106 such that the images 122-1, 122-2 . . . 122-N depict users 116 approaching, and/or at respective access control points 106. For example, it is understood that FIG. 1 depicts two moments in time: when the users 116 are unloading the plurality of objects 118 from the van 120, and when the first user 116-1 is at or approaching the first access control point 106-1.

Hence, the images 122-0 acquired by the zeroth camera 108-0 depict the users 116 and the objects 118. While in the depicted images 122-0, faces of the users 116 are not visible, other images 122-0 may include faces of the users 116, and the computing device 102 and/or the one or more analytics algorithms 104 and/or the VAE 110-0 may be configured to extract faces of the users 116 from the images 122-0.

Indeed, the computing device 102 and/or the one or more analytics algorithms 104 and/or the VAEs 110 may be generally configured to extract faces of the users 116 from the images 122.

The images 122-1 acquired by the first camera 108-1 depict the first user 116-1 transporting the first object 118-1, of the plurality of objects 118, at least when the first user 116-1 is at, or is approaching, the first access control point 106-1.

In general, the images 122 (e.g., of the images 122-0, 122-1, 122-2 . . . 122-N) are provided to the computing device 102, by the cameras 108, via respective communication links.

It is further understood that the images 122 may be provided to the computing device 102 with respective identifiers (not depicted) of access control points 106 with which they are associated, and/or an area with which they are associated. For example, the images 122-0 may be provided with an identifier "114" of the area 114, the images 122-1 may be provided with an identifier "106-1" of the first access control point 106-1, the images 122-2 may be provided with an identifier "106-2" of the second access control point 106-2, and the images 122-N may be provided with an identifier "106-N" of the Nth access control point 106-N.

Furthermore, as depicted, the first user 116-1 is presenting, to the first reader 112-1, an access card 124, which may store valid user credentials 126, and the first reader 112-1 is understood to read, from the access card 124, the valid user credentials 126. Such reading may occur wirelessly using radio frequency identification (RFID) and/or near field communication (NFC) techniques, and the like.

For simplicity, the valid user credentials 126 are labelled as "Creds. in FIG. 1, and interchangeably referred to hereafter as the credentials 126. The reader 112-1, having read the credentials 126 from the access card 124, provides the credentials 126 to the computing device 102. As depicted, a copy of the credentials 126c have been preconfigured at the computing device 102, such that the credentials 126 may be compared to the copy of the credentials 126c to determine whether or not the first user 116-1 has may be validated and granted entry through the first access control point 106-1.

In particular, the credentials 126, and/or the copy of the credentials 126c, may indicate that the first user 116-1 (e.g., or any user providing the credentials 126 or any user associated with the credentials 126, and/or the copy of the credentials 126c) is authorized to pass through any of the access control points 106. Hence, the credentials 126, and/or the copy of the credentials 126c may also be associated with the access control points 106. It is further understood that a building and/or location where the access control points 106 are located may include other access control points not associated with the credentials 126, and/or not associated with the copy of the credentials 126c, and through which the first user 116-1 is not authorized to pass through.

It is further understood that the copy of the credentials 126c may be acquired in a registration process. For example, the first user 116-1 may visit a security office associated with the building, and the like, at which the access control points 106 are located and be assigned the access card 124, which stores the credentials 126, and the copy of the credentials 126c may be uploaded to the computing device 102 upon such assignment. Alternatively, the copy of the credentials 126c may have been previously stored at the computing device 102. In such a registration process, an image 128 (and/or faceprint data) of the first user 116-1 may be acquired and, as depicted, stored in association with the copy of the credentials 126c at the computing device 102. The association between the copy of the credentials 126c and the image 128 is indicated by a broken line therebetween (in a format different from broken lines that indicate data flow); this convention will be used throughout the present specification.

Hence, upon receiving the credentials 126, and determining the credentials 126 match the copy of the credentials 126c, the computing device 102 may responsively control the first access control point 106-1 to allow entry therethrough for the first user 116-1. As has been previously described, however, the credentials 126, and the copy of the credentials 126c, may be in the form of read and/or scanned fingerprints of the first user 116-1, and/or the credentials 126, and the copy of the credentials 126c, may be in the form of an image of the first user 116-1.

As depicted, the copy of the credentials 126c may be stored in association with the image 128 that depicts the first user 116-1, which may be acquired in the aforementioned registration process. However, in other examples, the image 128 that depicts the first user 116-1 may comprise a portion of the first images 122-1 received when the credentials 126 are received from the first reader 112-1.

When the copy of the credentials 126c is in the form of an image of the first user 116-1, the copy of the credentials 126c may comprise the image 128 that depicts the first user 116-1.

As described herein, the computing device 102 controlling the access control points 106 to allow entry therethrough for the users 116 may include, but is not limited to, providing commands to the access control points 106 to cause the access control points 106 to one or more of unlock and/or open. It is further understood that, upon a user 116 being allowed entry through an access control point 106, the access control point 106 may thereafter lock and/or close. Such locking and/or closing may occur after a given period of time, such as 5 seconds, 10 seconds, 15 seconds, amongst other possibilities, and/or after a user 116 has passed through an access control point 106, for example as indicated in the images 122, and/or as detected via respective detectors (not depicted) that detect when a user 116 has passed through a respective access control point 106.

It is generally understood herein that the users 116 are tasked with transporting the plurality of objects 118 from the area 114 to a particular location 130, which, as depicted, is understood to be through the Nth and/or last access control point 106-N, and may be a secure area, and the like, or any other suitable area, where the objects 118 are to be transported. In transporting the plurality of objects 118 from the area 114 to the particular location 130, the users 116 are understood to travel along a path 132 that includes all the depicted access control points 106, and hence the users 116 must pass through all the depicted access control points 106 to reach the particular location 130. While for simplicity the path 132 is depicted as straight, the path 132 may include angles, curves, corners, and the like, and/or the path 132 may be along different floors of a building where the access control points 106 are located (e.g., up staircases and/or elevator shafts, and the like).

It is further understood that the term "entry", and the like, as used herein, may refer to a user 116 entering an access control point 106 from a side (e.g., an outer side) at which a respective reader 112 is located and/or a side at which a respective camera 108 is acquiring respective images 122, for example in a direction from the area 114 towards the particular location 130. Similarly, the term "exit", and the like, as used herein, may refer to a user 116 exiting an access control point 106 from a side (e.g., an inner side) opposite a side (e.g., an outer side) at which a respective reader 112 is located and/or a opposite a side at which a respective camera 108 is acquiring respective images 122, for example in a direction from the particular location 130 towards the area 114.

It is understood that presenting the card 124 at each reader 112 of each access control point 106 may be inefficient for such transport. It is further understood that comparing the credentials 126 with the copy of the credentials 126*c* may be a waste of processing resources at the computing device 102. An additional problem is the second user 116-2 is also understood to be transporting the objects 118 through the access control points 106, and for the second user 116-2 to be granted entry therethrough, either the second user 116-2 must be provided with a respective access card storing the same credentials 126 or different credentials (e.g., which then must be provisioned at the computing device 102), or the users 116 must share the one access card 124, which generally slows down the users 116 and further wastes processing resources as the same credentials 126 must be processed twice for every entry to an access control point 106 by the two users 116. Furthermore, in examples where the copy of the credentials 126*c* comprises the image 128 of the first user 116-1, the second user 116-2 may not be able to gain access to the access control points 106.

To obviate such technical problems the computing device 102 is generally configured to implement certain technical processes that provide a technical solution thereto, as is next described.

The computing device 102 is generally configured to receive, from the first access control point 106-1 (e.g., the first reader 112-1), the valid user credentials 126 associated with the first user 116-1, and responsively control the first access control point 106-1 to allow entry therethrough for the first user 116-1.

The computing device 102 is further generally configured to receive, from the one or more cameras 108, images 122 that depict the first user 116-1, the second user 116-2, and the plurality of objects 118. Indeed, receipt of the valid user credentials 126 and controlling the first access control point 106-1 to allow entry therethrough for the first user 116-1 may occur in any suitable order and/or in parallel with each other.

The computing device 102 is further generally configured to determine, using the one or more analytics algorithms 104 applied to the images 122, that the first user 116-1 is transporting a first object 118-1 of the plurality of objects 118, and that the plurality of objects 118 are detectably associated with each other. Put another way, the VAEs 110 and/or the one or more analytics algorithms 104 are understood to have been previously configured and/or trained to recognize when images depict users transporting objects, as described herein.

Furthermore, such detectable association of the objects 118 may be determined in any suitable manner. For example, the images 122 (e.g., the images 122-0) may indicate that the plurality of objects 118 are all initially located at and/or in the van 120 and/or at the area 114 and hence are detectably associated with each other. Alternatively, or in addition, the images 122 may indicate that the plurality of objects 118 are all components of a particular set, such as a drum kit and/or an audio system and/or a computer system and/or lab instruments and the like. Alternatively, or in addition, the images 122 may indicate that the plurality of objects 118 are all packaged in a similar manner and/or include a same logo and/or are all about the same size, amongst other possibilities. Again, such a determination may occur via the one or more analytics algorithms 104 analyzing the images 122 and/or metadata thereof.

Hence, the term "detectable association", and the like, of the objects 118 may include the objects 118 being visibly recognizable, within the images 122, as being associated with each other, for example by the VAEs 110 and/or the one or more analytics algorithms 104. Put another way, the term "detectable association", and the like, of the objects 118 may include the VAEs 110 and/or the one or more analytics algorithms 104 being previously configured and/or trained to detect certain associations between objects, as described herein.

The computing device 102 is further generally configured to determine, using the one or more analytics algorithms 104 applied to the images 122, that the second user 116-2 is transporting a second object 118-2 of the plurality of objects 118, and that the second user 116-2 is at or is approaching the first access control point 106-1.

The computing device 102 may generally extend application of the of the valid user credentials 126 to the second user 116-2, even though the valid user credentials 126 may be associated with the first user 116-1, for example on the basis of the second user 116-2 transporting a second object 118-2 that is associated with the first object 118-1 by way of both the objects 118-1, 118-2 being associated with the plurality of objects 118.

Alternatively, or in addition, the computing device 102 may generally extend application of the of the valid user credentials 126 to the second user 116-2, on the basis of the second user 116-2 being associated with the first user 116-1, for example as determined from the images 122. For example, the images 122 may indicate that the users 116 are wearing a same uniform, and/or the images 122-0 from the zeroth camera 108-0 may indicate that the users 116 both exited from the van 120, and/that the users 116 both unloaded the objects 118 from the van 120, amongst other possibilities.

The computing device 102 is further generally configured to responsively control the first access control point 106-1 to allow entry therethrough for the second user 116-2 based on extended application of the valid user credentials 126 to the second user 116-2.

It is further understood that the computing device 102 is further generally configured to extend application of the valid user credentials 126 to other access control points 106 on the path 132 for both the first user 116-1 and the second user 116-2, at least until all the objects 118 have been transported to the particular location 130 and the first user 116-1 and the second user 116-2 have exited the first access control point 106-1. Furthermore, while present examples are described with respect to "N" access control points 106, examples herein that include the first user 116-1 and the second user 116-2 may apply to as few as one access control point 106, such as the first access control point 106-1.

However, in some examples only the first user 116-1 may be transporting the objects 118, and the valid user credentials 126 may be used to responsively control any access control point 106 on the path 132 to allow entry therethrough for the first user 116-1.

In this manner, the valid user credentials 126 may be provided once, and the valid user credentials 126 may be used to provide access to both users 116 through all the access control points 106, thereby reducing processing in the system 100, at least with respect to the valid user credentials 126.

Regardless, it is understood that the first user 116-1 has one or more of been issued the access card 124 that stores the credentials 126, and/or has registered with the system 100, such that a copy of the credentials 126c, in any suitable format, has been stored at the computing device 102.

Furthermore, while examples are described herein with respect to two users 116, processes and methods as described herein may be for more than two users. For example, the valid user credentials 126 may extended to a third user transporting the detectably associated objects 118, assuming that the computing device 102 determines that the third user is associated with the first user 116-1.

Furthermore, while examples are described herein with respect to the users 116 being movers unloading the van 120, processes and methods as described herein may be applied in other situations where a plurality of users are transporting detectably associated objects through the access control points 106. For example, employees in a building where the access control points 106 are located may be transporting detectably associated objects from one part of the building to another part of the building, through various access control points 106. In these examples a first access control point 106 at which a first user provides credentials may not be an entrance to the building, but rather such a first access control point 106 may be any access control point 106 along a path through the building along which the first user may be transporting the detectably associated objects, including, but not limited to, an elevator door, a staircase door, an internal hallway door, an internal office door, and the like.

Figure 2:
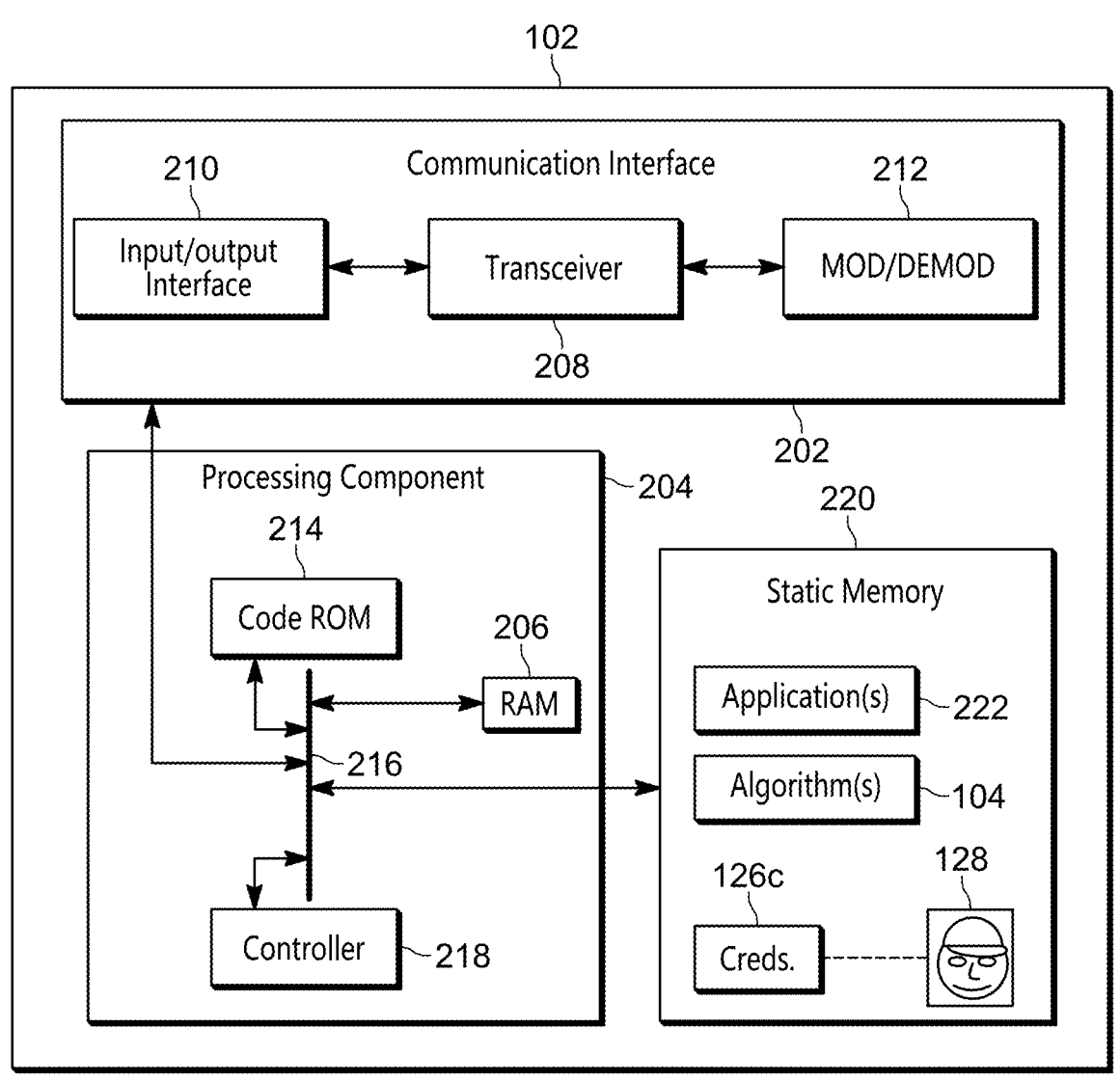
FIG. 2 is a device diagram showing a device structure of a device for controlling access control points, in accordance with some examples.

Attention is next directed to FIG. 2, which depicts a schematic block diagram of an example of the computing device 102. While the computing device 102 is depicted in FIG. 2 as a single component, the computing device 102 may be distributed among a plurality of components and the like including, but not limited to, any suitable combination of one or more servers, one or more cloud computing devices, and the like.

As depicted, the computing device 102 comprises: a communication interface 202, a processing component 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

As depicted, the memory 220 further stores the one or more analytics algorithms 104 which may be processed to implement the one or more analysis engines.

As depicted, the memory 220 further stores the copy of the credentials 126c in association with the image 128 of the first user 116-1.

While not depicted, the computing device 102 may include, and/or be in communication with, one or more of an input component and a display screen (and/or any other suitable combination of input and/or output components) and the like.

As shown in FIG. 2, the computing device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other suitable components of the system 100.

For example, the communication interface 202 may include one or more transceivers 208 and/or wireless transceivers for communicating with other suitable components of the system 100 such as the access control points 106, the cameras 108 and the readers 112. Hence, the one or more transceivers 208 may be adapted for communication with one or more communication links and/or communication networks used to communicate with the other components of the system 100. For example, the one or more transceivers 208 may be adapted for communication with one or more of the Internet, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3$^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include, but are not limited to, a cell phone transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for controlling access control points. For example, in some examples, the computing device 102 and/or the controller 218 specifically comprises a computer executable engine configured to implement functionality for controlling access control points.

The static memory 220 comprises a non-transitory machine readable medium that stores machine readable instructions to implement one or more programs or applications and/or program code. Example machine readable media include a non-volatile storage unit (e.g., Erasable Electronic Programmable Read Only Memory ("EE-PROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

In particular, the memory 220 stores instructions and/or program code and/or a set of instructions corresponding to the at least one application 222 that, when executed by the controller 218, enables the controller 218 to implement functionality for controlling access control points, including but not limited to, the blocks of the method set forth in FIG. 3.

Put another way, the memory 220 may comprise a (e.g., non-transitory) computer-readable storage medium having stored thereon program instructions that, when executed by the controller 218, cause the controller 218 to perform a set of operations comprising the blocks of the method set forth in FIG. 3

The application 222 and/or the one or more analytics algorithms 104 may include programmatic algorithms, and the like, to implement functionality as described herein.

Alternatively, and/or in addition to programmatic algorithms, the application 222 and/or the one or more analytics algorithms 104 may include one or more machine learning algorithms to implement functionality as described herein, for example identify users and/or objects and/or actions and/or associations in images.

The one or more machine learning algorithms of the application 222 and/or the one or more analytics algorithms 104 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Furthermore, in examples where the application 222 and/or the one or more analytics algorithms 104 includes one or more machine learning algorithms, the application 222 and/or the one or more analytics algorithms 104 may be operated in a training mode to train the application 222 and/or the one or more analytics algorithms 104 to implement the functionality described herein. For example, after implementing the method described with respect to FIG. 3, the input and output from the application 222 and/or the one or more analytics algorithms 104 may be labelled as positive training data (e.g., when the output corresponds to a correct decision by the application 222 and/or the one or more analytics algorithms 104) or negative training data (e.g., when the output does not correspond to a correct decision by the application 222 and/or the one or more analytics algorithms 104), and used to train from the application 222 and/or the one or more analytics algorithms 104.

While components of the cameras 108 are not depicted, the cameras 108 may have a structure similar to that of the computing device 102, but adapted for respective functionality of the cameras 108. For example, the cameras 108 may be understood to include an image sensor, such as a CCD (charge-coupled device) a CMOS (complementary metal-oxide semiconductor), and the like. Furthermore, in some examples, the cameras 108 may include any suitable processing resources (e.g., as depicted in FIG. 2) for implementing the VAEs 110, which may include any suitable combination of programmatic algorithms and machine learning algorithms to implement functionality as described herein.

Attention is now directed to FIG. 3, which depicts a flowchart representative of a method 300 for controlling access control points. The operations of the method 300 of FIG. 3 correspond to machine readable instructions that are executed by the controller 218 and/or at least one computing device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the at least one computing device 102, receives, from the first access control point 106 (e.g., from the first reader 112-1, and the like), via the communication interface 202, valid user credentials 126 associated with the first user 116-1, and responsively controls the first access control point 106-1 to allow entry therethrough for the first user 116-1. For example, such responsive control of the first access control point 106-1 to allow entry therethrough for the first user 116-1 occurs when the valid user credentials 126 match the copy of the credentials 126c.

It is understood that the first user 116-1 may pass through the first access control point 106-1 when the first access control point 106-1 is controlled to allow entry therethrough for the first user 116-1. However, the first user 116-1 may not necessarily pass through the first access control point 106-1, but may provide the valid user credentials 126 to the first access control point 106-1 in order to initiate the method 300.

It is further understood that, hereafter, the computing device 102 responsively controlling the first access control point 106-1 to allow entry therethrough for the first user 116-1 occurs when the first user 116-1 is authorized to enter the first access control point 106-1, for example with the valid user credentials 126 match the copy of the credentials 126*c*. It is further understood that allowing entry of the first user 116-1 through the first access control point 106-1 may comprise granting of access of the first user 116-1 to the first access control point 106-1. Hence, the terms "allowing entry", and the like, "granted entry", and the like, "granting access", and the like, and "authorized to enter", and the like may be used interchangeably in the present specification.

At a block 304, the controller 218, and/or the at least one computing device 102, receives, from one or more cameras 108, via the communication interface 202, images 122 that depict the first user 116-1, the second user 116-2, and the plurality of objects 118.

At a block 306, the controller 218, and/or the at least one computing device 102, determines, using one or more analytics algorithms 104 applied to the images 122, that the first user 116-1 is transporting the first object 118-1 of the plurality of objects 118, and that the plurality of objects 118 are detectably associated with each other.

The one or more analytics algorithms 104 applied to the images 122 may comprise one or more of: one or more video analytics algorithms applied to the images 122; and one or more metadata analytics algorithms applied to metadata associated with the images 122. In examples where one or more analytics algorithms 104 comprises one or more metadata analytics algorithms, it is understood that the one or more cameras 108 comprise one or more respective video analytics algorithms 110 that: analyze respective images 122 to identify one or more of the first user 116-1, the second user 116-2, and the plurality of objects 118 in the respective images 122; and add identifiers of one or more of the first user 116-1, the second user 116-2 and the plurality of objects 118 to respective metadata of the respective images 122. Such identifiers are understood to be sufficient for the computing device 102 to determine whether images of faces of the users 116 in the images 122 match images of the users 116 stored at the computing device, such as the image 128; for example, such identifiers may be in form of vectors, which identify faces of the users 116.

Hence, video analytics of the images 122 may be distributed between the at least one computing device 102 and the cameras 108.

At a block 308, the controller 218, and/or the at least one computing device 102, determines, using the one or more analytics algorithms 104 applied to the images 122, that the second user 116-2 is transporting a second object 118-2 of the plurality of objects 118.

Furthermore, it is understood that the blocks 302, 304, 306, 308 may occur in any suitable order, and it is further understood that the images 122 that depict the first user 116-1, the second user 116-2, and the plurality of objects 118 may be received at the computing device 102 with the valid user credentials 126 and/or may be received at the computing device 102 before or after the computing device 102 receives the valid user credentials 126.

At a block 310, the controller 218, and/or the at least one computing device 102, determines, using the one or more analytics algorithms 104 applied to the images 122, that the second user 116-2 is at, or is approaching, the first access control point 106-1.

For example, the second user 116-2 may be at, or may be approaching, the first access control point 106-1 after the first user 116-1 has passed through the first access control point 106-1 and/or after the first access control point 106-1 has been controlled to allow entry therethrough for the first user 116-1 (e.g., whether or not the first user 116-1 has passed through the first access control point 106-1).

At a block 312, the controller 218, and/or the at least one computing device 102, responsively controls the first access control point 106-1 to allow entry therethrough for the second user 116-2 based on extended application of the valid user credentials 126 to the second user 116-2. For example, such control may occur via commands transmitted and/or provided via the communication interface 202.

For example, based on the images 122, the computing device 102 may determine that the users 116 are associated, and responsively extend the valid user credentials 126, associated with the first user 116-1, to the second user 116-2. For example, in response to determining that the second user 116-2 is associated with the first user 116-1, the computing device 102 may store an image of the second user 116-2 in association with the copy of the credentials 126, which may be acquired from the images 122, such as the images 122-0 from the zeroth camera 108-0, or images 122-1 from the first camera 108-1. Such storage may indicate that the second user 116-2 is authorized to pass through any access control point 106 which the first user 116-1 has also passed through, and/or such storage may indicate that the second user 116-2 is authorized to pass through any access control point 106 which has been controlled to allow entry therethrough for the first user 116-1.

However, such extending of the valid user credentials 126 to the second user 116-2 may further depend on the users 116 transporting the objects 118 that are detectably associated with each other. Put another way, the computing device 102 may extend the valid user credentials 126 to the second user 116-2 based on determining both: that the users 116 are transporting objects 118 associated with each other; and that the users 116 are associated.

The method 300 may include other features.

For example, the method 300 may further comprise, the controller 218 and/or the at least one computing device 102: determining, using the one or more analytics algorithms 104 applied to the images 122, that the second user 116-2 is associated with the first user 116-1; and associating the valid user credentials 126 with the second user 116-2 (e.g., extended application of the valid user credentials 126 to the second user 116-2) may occur only when: the second user 116-2 is transporting the second object 118-2 of the plurality of objects 118; and the second user 116-2 is associated with the first user 116-1.

Hence, in this example, when the second user 116-2 is not transporting an object 118 of the plurality of objects 118, associating the valid user credentials 126 with the second user 116-2 (e.g., extending application of the valid user credentials 126 to the second user 116-2) may not occur.

In further examples, the method 300 may further comprise, the controller 218 and/or the at least one computing device 102: determining, using the one or more analytics algorithms 104 applied to the images 122, that the first user 116-1 is at or is approaching the second access control point 106-2 after entering the first access control point 106-1; and responsively controlling the second access control point 106-2 to allow entry therethrough for the first user 116-1 based on the valid user credentials 126.

Put another way, after the first access control point 106-1 has been controlled to allow entry therethrough for the first user 116-1, the second access control point 106-2, or indeed any access control point 106 associated with the credentials 126, and/or the copy of the credentials 126*c*, may be controlled to allow entry therethrough for the first user 116-1, when the first user 116-1 is at or is approaching the second access control point 106-2 and/or any access control point 106 associated with the credentials 126 and/or the copy of the credentials 126c. Indeed, such control of the access control points for the first user 116-1 may occur independently of control of the access control points for the second user 116-2. It is understood that such granting of access may occur when, and/or only when, the first user 116-1 is transporting at least one of the objects 118.

In yet further examples, the method 300 may further comprise, the controller 218 and/or the at least one computing device 102: determining, using the one or more analytics algorithms 104 applied to the images 122, that the second user 116-2 is at or is approaching the second access control point 106-2 after entering the first access control point 106-1, the first user 116-1 having been previously granted access to the second access control point 106-2 based on the valid user credentials 126; and responsively controlling the second access control point 106-2 to allow entry therethrough for the second user 116-2 based on the valid user credentials 126.

Put another way, after the first access control point 106-1 has been controlled to allow entry therethrough for the second user 116-2, the second access control point 106-2, or indeed any access control point 106 associated with the credentials 126 and/or the copy of the credentials 126c, may be controlled to allow entry therethrough for the second user 116-2, when the second user 116-2 is at or is approaching the second access control point 106-2 and/or any access control point 106 associated with the credentials 126 and/or the copy of the credentials 126c.

Put yet another way, once the valid user credentials 126 have been associated with, or extended to, the second user 116-2, the second user 116-2 may be granted access to any access control point 106 to which the first user 116-1 has previously been granted access. It is understood that such granting of access may occur when, and/or only when, the second user 116-2 is transporting at least one of the objects 118.

In yet further examples, the method 300 may further comprise, the controller 218 and/or the at least one computing device 102: determining, using the one or more analytics algorithms 104 applied to the images 122, that the first user 116-1 has exited the first access control point 106-1; and thereafter: determining, using the one or more analytics algorithms 104 applied to the images 122, that the first user 116-1 is transporting a third object 118 of the plurality of objects 118, and that the first user 116-1 is at or is approaching the first access control point 106-1; and responsively controlling the first access control point 106-1 to allow entry therethrough for the first user 116-1.

Put another way, in yet further examples, the method 300 may further comprise, the controller 218 and/or the at least one computing device 102: determining, using the one or more analytics algorithms 104, a path 132 of the first user 116-1 from the first access control point 106-1 to the particular location 130; and responsively controlling any access control points 106 between the first access control point 106-1 and the particular location 130 to allow entry therethrough for the first user 116-1 and the second user 116-2 based on the valid user credentials 126, as the first user 116-1 and the second user 116-2 are respectively at or are approaching the access control points 106.

Put another way, access to the first access control point 106-1, and/or any access control points 106 to which the first user 116-1 was previously granted access, may continue while the first user 116-1 and the second user 116-2 continue to transport the objects 118. Hence, when the first user 116-1 transports the first object 118-1 through the access control points 106 along the path 132, to the particular location 130, and thereafter exits the access control points 106 to return to the area 114 to transport more of the objects 118, the first user 116-1 may again be granted entry to the access control points 106 along the path 132 without having to again provide the card 124 and/or the credentials 126 to any of the readers 112.

Similarly, when the second user 116-2 transports the second object 118-2 through the access control points 106 along the path 132, to the particular location 130, and thereafter exits the access control points 106 to return to the area 114 to transport more of the objects 118, the second user 116-2 may again be granted entry to the access control points 106 along the path 132 without having to provide the card 124 and/or the credentials 126 to any of the readers 112.

In yet further examples, the method 300 may further comprise, the controller 218 and/or the at least one computing device 102: determining, using the one or more analytics algorithms 104 applied to the images 122, that all of the plurality of objects 118 have been transported through the first access control point 106-1, and that the first user 116-1 and the second user 116-2 have thereafter exited the first access control point 106-1; and revoking the valid user credentials 126.

Put another way, the images 122 may indicate that there are no further objects 118 in the area 114, and/or the images 122 may indicate that all the objects 118 have been transported to the particular location 130, and the like. The images 122 may further indicate that the users 116 have, thereafter, both exited the first access control point 106-1 and/or have returned to the area 114. In these examples, the valid user credentials 126 may be revoked and/or disassociated with the users 116, such that the users 116 may no longer be granted access to the first access control point 106-1 and/or any of the access control points 106 to which access was previously granted.

Put yet another way, in these examples, use of the valid user credentials 126 to transport the objects 118 may be only temporary, such that the valid user credentials 126 may enable entry to the access control points 106 only while the objects 118 are being transported.

In yet further examples, the method 300 may further comprise, the controller 218 and/or the at least one computing device 102: determining, using the one or more analytics algorithms 104 applied to the images 122, that all of the plurality of objects 118 have been transported through the first access control point 106-1, and that the first user 116-1 and the second user 116-2 have thereafter exited the first access control point 106-1; and, disassociating the valid user credentials 126 with the second user 116-2.

Put another way, the images 122 may indicate that there are no further objects 118 in the area 114, and/or the images 122 may indicate that all the objects 118 have been transported to the particular location 130, and the like. The images 122 may further indicate that the users 116 have, thereafter, both exited the first access control point 106-1 and/or have returned to the area 114. In these examples, the valid user credentials 126 may be revoked for the second user 116-2, and/or disassociated with the second user 116-2, but may remain associated with the first user 116-1.

Put yet another way, in these examples, use of the valid user credentials 126 may persist for the first user 116-1, such that, when the first user 116-1 again attempts to transport other objects (e.g., in another delivery) through the first access control point 106-1, the method 300 may again be implemented.

In yet further examples, the method 300 may further comprise, the controller 218 and/or the at least one computing device 102: determining, using the one or more analytics algorithms 104 applied to the images 122, that all of the plurality of objects 118 have been transported through the first access control point 106-1, and that the first user 116-1 and the second user 116-2 have thereafter exited the first access control point 106-1; and, restricting access to the first access control point 106-1 to the first user 116-1 until the valid user credentials 126 are again received from the first access control point 106-1.

Put another way, the images 122 may indicate that there are no further objects 118 in the area 114, and/or the images 122 may indicate that all the objects 118 have been transported to the particular location 130, and the like. The images 122 may further indicate that the users 116 have, thereafter, both exited the first access control point 106-1 and/or have returned to the area 114. In these examples, the valid user credentials 126 may be revoked for the second user 116-2, and/or disassociated with the second user 116-2, but may remain associated with the first user 116-1, such that the first user 116-1 may continue to gain access to the first access control point 106-1 without having to provide the valid user credentials 126.

Put yet another way, in these examples, use of the valid user credentials 126 may persist for the first user 116-1 along with automatic access to the first access control point 106-1 and/or any other access control points 106 associated with the valid user credentials 126, such that, when the first user 116-1 again approaches, or is at, the first access control point 106-1, the first access control point 106-1 is controlled to allow entry therethrough for the first user 116-1. However, to again implement the method 300 allow entry therethrough for another user determined to be associated with the first user 116-1, the first user 116-1 must again provide the valid user credentials 126 at the first access control point 106-1 and be transporting objects and/or detectably associated objects.

Aspects of the method 300 are next described with respect to FIG. 4, FIG. 5, FIG. 6, and FIG. 7, which are substantially similar to FIG. 1, with like components having like numbers. While not all aspects of FIG. 1 are depicted in FIG. 4, FIG. 5, FIG. 6, and FIG. 7, such aspects may nonetheless be present; for example, for simplicity, not all of the images 122 being provided to the computing device 102 are depicted in FIG. 4, FIG. 5, FIG. 6, and FIG. 7, but they may nonetheless be present.

Figure 4:
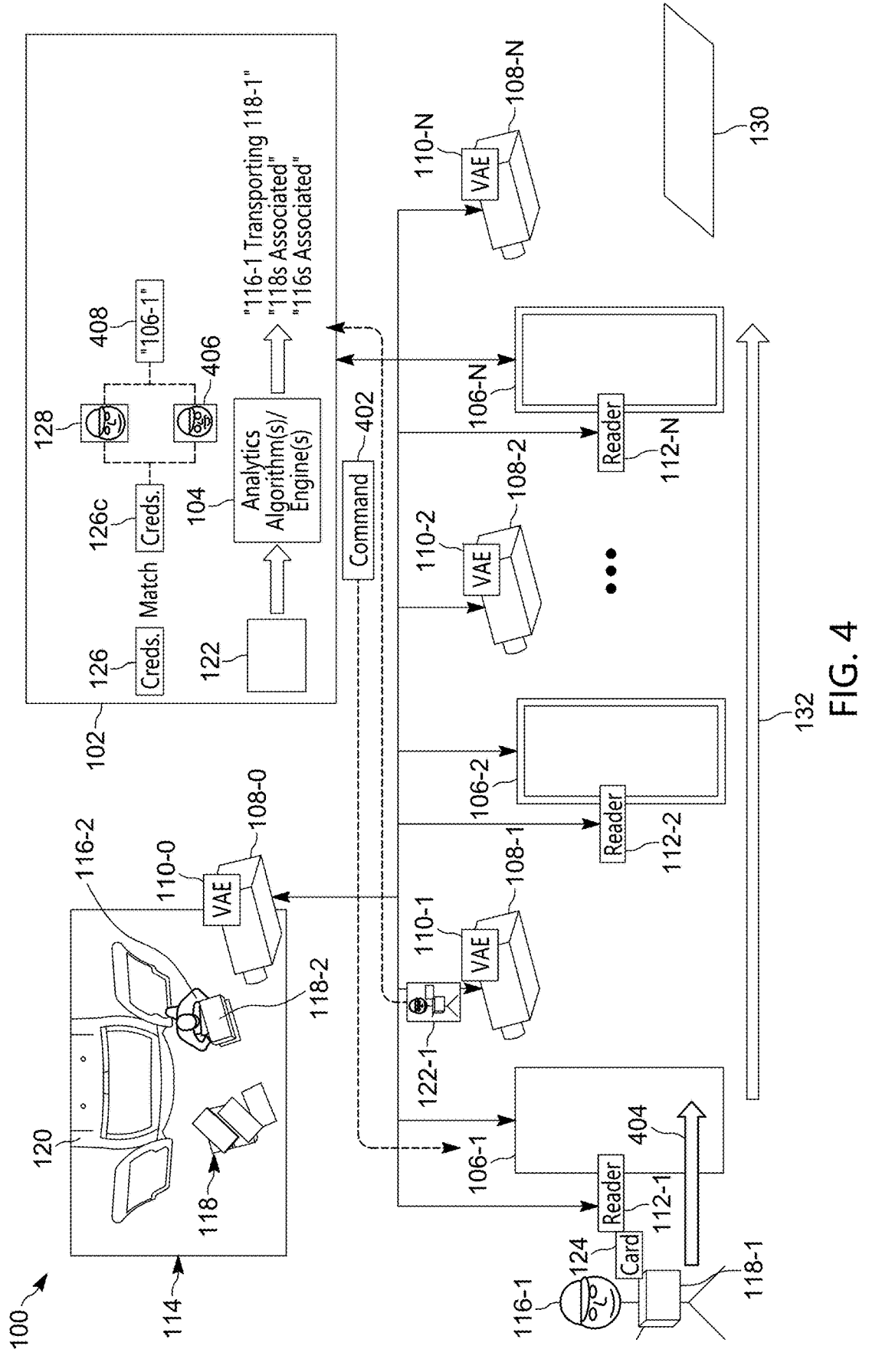
FIG. 4 depicts the system of FIG. 1 implementing a method for controlling access control points, in accordance with some examples.

Attention is first directed to FIG. 4, which depicts the first user 116-1 at the first access control point 106-1 (and no longer at the area 114).

It is furthermore understood in FIG. 4 that the credentials 126 have been provided to the computing device 102, as described herein at least with respect to FIG. 1.

As such, the computing device 102 compares the credentials 126 with the copy of the credentials 126c, and determines that the credentials 126 match the copy of the credentials 126c. As such, the computing device 102 controls (e.g., at the block 302 of the method 300) the first access control point 106-1 to allow entry therethrough for the first user 116-1, for example by providing a command 402 to the first access control point 106-1 to cause the first access control point 106-1 to unlock and/or open, as represented by the smaller, inner rectangle, being omitted from the first access control point 106-1. Hence, the first user 116-1 may enter and/or pass through the first access control point 106-1 as represented by an arrow 404.

It is furthermore understood in FIG. 4 that images 122 (e.g., which may include the images 122-0 from the zeroth camera 108-0) that depict the first user 116-1, the second user 116-2 and the plurality of objects 118 as located in the area 114 have been provided to the computing device 102, as described herein at least with respect to FIG. 1. Hence, the computing device 102 receives (e.g., at the block 304 of the method 300), from one or more of the cameras 108, images 122 that depict the first user 116-1, the second user 116-2, and the plurality of objects 118).

Also depicted in FIG. 4, the first camera 108-1 is providing images 122-1 to the computing device 102 that depict the first user 116-1 transporting the first object 118-1 located at the first access control point 106-1.

As depicted, the computing device 102 provides, as input to the one or more analytics algorithms 104, the images 122, including the images 122-0, 122-1. As further depicted, the one or more analytics algorithms 104 processes the images 122 (which may include, but is not limited to, processing the metadata of the images 122 determined via one or more of the VAEs 110).

As further depicted, the computing device 102 determines (e.g., at the block 306 of the method 300), using the one or more analytics algorithms 104 applied to the images 122, that the first user 116-1 is transporting the first object 118-1 of the plurality of objects 118, and that the plurality of objects 118 are detectably associated with each other. Such a determination is depicted in FIG. 4 by way of the one or more analytics algorithms 104 outputting respective text "116-1 Transporting 118-1" and "118s Associated", however any suitable indication of the first user 116-1 transporting the first object 118-1 of the plurality of objects 118, and the plurality of objects 118 being detectably associated with each other, is within the scope of the present specification. It is further understood, however, that the computing device 102 may not specifically and/or exactly identify the first object 118-1, but may rather identify that the first user 116-1 is transporting one object 118 of the plurality of objects 118.

It is further understood that identification of the plurality of objects 118 may be an ongoing process. For example, not all of the objects 118 may initially be visible in the images 122-0 from the zeroth camera 108-0, and the like, as one or more of the objects 118 may hide or obscure one or more other objects 118. Hence, as the objects 118 are transported, previously hidden or obscured objects 118 may appear in the images 122-0, and the like, and the computing device 102 may identify such previously hidden or obscured objects 118 as they appear in the images 122-0, and the like.

It is further understood that, in examples where the image 128 has been preconfigured at the computing device 102 in a registration process, the images 122-1 that depict the first user 116-1 may be used to determine that the first user 116-1 is at the first access control point 106-1 by comparing the images 122-1 that depict the first user 116-1 with the image 128 of the first user 116-1. Indeed, the image 128 may also be used as input to the one or more analytics algorithms 104 to make such a comparison.

As further depicted in FIG. 4, the computing device 102 determines, using the one or more analytics algorithms 104 applied to the images 122, that the second user 116-2 is associated with the first user 116-1. Such a determination is depicted in FIG. 4 by way of the one or more analytics algorithms 104 outputting text "116s Associated", however any suitable indication of the users 116 being associated with each other is within the scope of the present specification.

In response to determining that the users 116 are associated, the computing device 102 extends the valid user credentials 126 to the second user 116-2. For example, as depicted, the computing device 102 may store an image 406

(and/or faceprint data) of the second user 116-2 in association with the copy of the credentials 126c that may be acquired from the images 122-0 from the zeroth camera 108-0.

The computing device 102, as depicted, may further associate the users 116 with a list 408 of identifiers of access control points 106 for which the first user 116-1 has been granted access. For example, as depicted, the list 408 comprises an identifier "106-1" identifying the first access control point 106-1. The identifier "106-1" may be received at the computing device 102 with the images 122-1.

Figure 5:
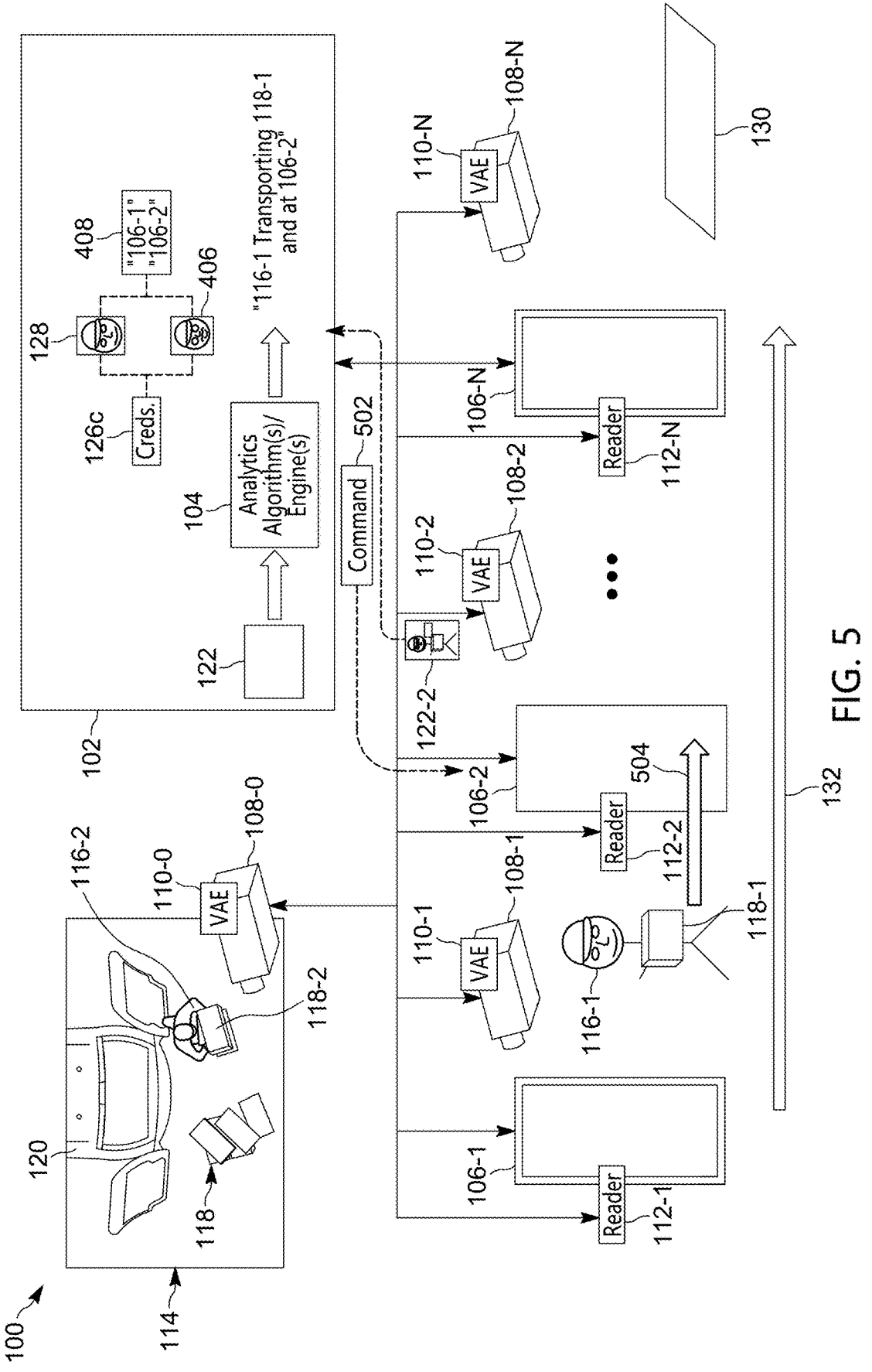
FIG. 5 depicts the system of FIG. 1 continuing to implement a method for controlling access control points, in accordance with some examples.

Attention is next directed to FIG. 5, which is understood to follow in time from FIG. 4. At FIG. 5, the first user 116-1 has transported the first object 118-1 through the first access control point 106-1, which has been locked and/or closed thereafter, automatically and/or by the computing device 102 providing a lock and/or close command thereto (not depicted). The first access control point 106-1 is hence again depicted with two rectangles.

The first user 116-1 is now at the second access control point 106-2, and the second camera 108-2 is acquiring images 122-2 of the first user 116-1 transporting the first object 118-1 at the second access control point 106-1. The images 122-2 are received at the computing device 102, which provides the images 122-2 (e.g., amongst the other images 122) as input to the one or more analytics algorithms 104, which determines, from the images 122 (e.g., and specifically the images 122-2) that the first user 116-1 is transporting the first object 118-1 and is located at the second access control point 106-2. Such a determination is depicted in FIG. 5 by way of the one or more analytics algorithms 104 outputting respective text "116-1 Transporting 118-1 And At 106-2", however any suitable indication of the first user 116-1 transporting the first object 118-1 and being located at the second access control point 106-2 is within the scope of the present specification.

It is further understood that the images 122-2 that depict the first user 116-1 may be used to determine that the first user 116-1 is at the second access control point 106-2 by comparing the images 122-2 that depict the first user 116-1 with the image 128 of the first user 116-1. Indeed, the image 128 may also be used as input to the one or more analytics algorithms 104 to make such a comparison.

Having determined that the first user 116-1 is transporting the first object 118-1 and is located at the second access control point 106-2, the computing device 102 controls the second access control point 106-2 to allow entry therethrough for the first user 116-1, for example by providing a command 502 to the second access control point 106-2 to cause the second access control point 106-2 to unlock and/or open, as represented by the smaller, inner rectangle, being omitted from the second access control point 106-2. Hence, the first user 116-1 may enter and/or pass through the second access control point 106-2 as represented by an arrow 504.

The computing device 102, as depicted, may further update the list 408 of identifiers of access control points 106 for which the first user 116-1 has been granted access and/or entry. For example, as depicted, the list 408 has added an identifier "106-2" identifying the second access control point 106-2 to the list 408.

Figure 6:
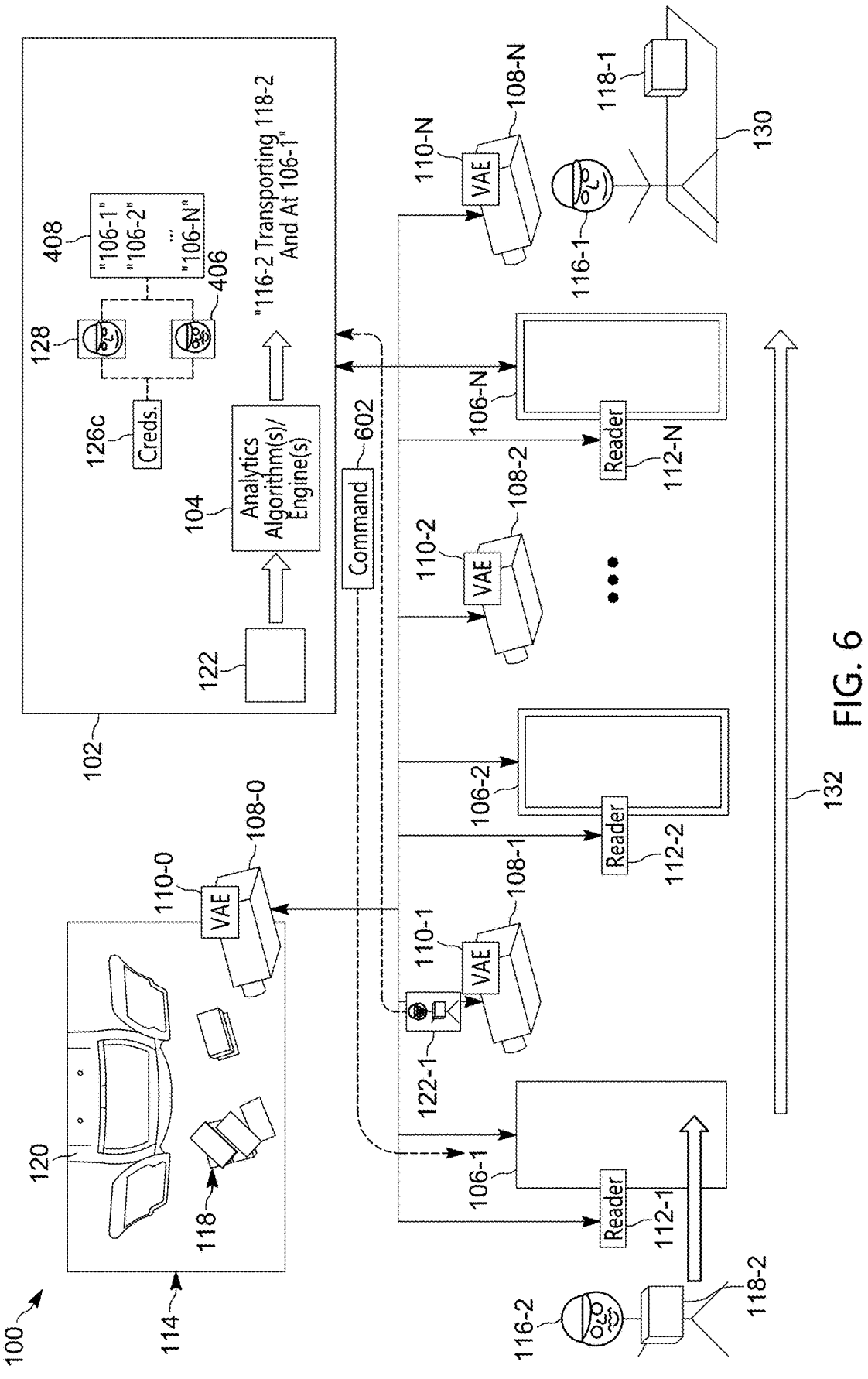
FIG. 6 depicts the system of FIG. 1 continuing to implement a method for controlling access control points, in accordance with some examples.

With attention next directed to FIG. 6, which is understood to follow in time from FIG. 5, this process may continue until the first user 116-1 reaches the particular location 130. For example, in FIG. 6, the first user 116-1 has been granted entry to all the access control points 106, and hence the list 408 includes identifiers of all the access control points 106 (e.g., "106-1", "106-2", . . . "106-N").

Furthermore, all the access control points 106-2, 106-N are depicted as locked and/or closed via two rectangles.

In particular, as depicted, the first user 116-1, having arrived at the particular location 130 may place the first object 118-1 in the particular location 130, and while not depicted, the first user 116-1 may thereafter, exit the access control points 106 to return to the area 114. It is assumed herein that exiting access control points 106 does not require control of the access control points 106 by the computing device 102, however such control may occur. Indeed, exiting of the access control points 106 may occur in any suitable manner.

It is yet further understood that the second user 116-2 may be granted entry and/or access to any of the access control points 106 on the list 408, to which the first user 116-1 was previously granted access and/or entry.

For example, FIG. 6 further depicts the second user 116-2 at the first access control point 106-1, and images 122-1 received at the computing device 102 from the first camera 108-1 depict the second user 116-2 transporting the second object 118-2. The computing device 102 inputs the images 122-1 (e.g., along with other images 122) into the one or more analytics algorithms 104, and determines (e.g., at the block 308 and the block 310 of the method 300), using the one or more analytics algorithms 104 applied to the images 122 (e.g., including the images 122-1), that the second user 116-2 is transporting the second object 118-2 of the plurality of objects 118 and is at the first access control point 106-1 (e.g., by way of the images 122-1 that include a depiction of the second user 116-2 being from the first camera 108-1 that is associated with the first access control point 106-1 and/or the images 122-1 being received with an identifier of the first access control point 106-1). Such a determination is depicted in FIG. 6 by way of the one or more analytics algorithms 104 outputting respective text "116-2 Transporting 118-2 And At 106-1", however any suitable indication of the second user 116-2 transporting the second object 118-2 of the plurality of objects 118 and being at the first access control point 106-1, is within the scope of the present specification. It is further understood, however, that the computing device 102 may not specifically and/or exactly identify the second object 118-2, but may rather identify that the second user 116-2 is transporting one object 118 of the plurality of objects 118.

As the valid user credentials 126 have been extended to, and/or associated with, the second user 116-2, and as an identifier "106-1" of the first access control point 106-1 is on the list 408, the computing device 102 controls (e.g., at the block 312 of the method 300) the first access control point 106-1, for example via a command 602 provided to the first access control point 106-1, to allow entry therethrough for the second user 116-2 (e.g., based on extended application of the valid user credentials 126 to the second user 116-2, and based on the first user 116-1 having previously been granted access and/or entry to the first access control point 106-1, as indicated by the identifier "106-1" being on the list 408). As the command 602 is understood to unlock and/or open the first access control point 106-1, the first access control point 106-1 is depicted with one rectangle.

It is further understood that the images 122-1 that depict the second user 116-2 may be used to determine that the second user 116-2 is at the first access control point 106-1 by comparing the images 122-1 that depict the second user 116-2 with the image 406 of the second user 116-2. Indeed, the image 406 may also be used as input to the one or more analytics algorithms 104 to make such a comparison.

It is further understood that as the second user 116-2 approaches, or is at, any of the access control points 106 identified by the list 408, the computing device 102 may responsively control such access control points 106 to allow entry therethrough for the second user 116-2. Hence, the second user 116-2 may continue along the path 132 to the particular location 130, and may place the second object 118-2 in the particular location 130 and exit the access control points 106 to return to the area 114.

The processes described with respect to FIG. 4, FIG. 5, and FIG. 6 may continue until all the objects 118 have been placed in the particular location 130, and/or at least until no objects 118 remain in the area 114. Indeed, in some examples, there may be more than one location to which objects 118 are to be transported (e.g., areas between depicted access control points 106 and/or to another particular location different from the particular location 130 that may be along the depicted path 132 or may be along another path that may branch from the depicted path 132).

Figure 7:
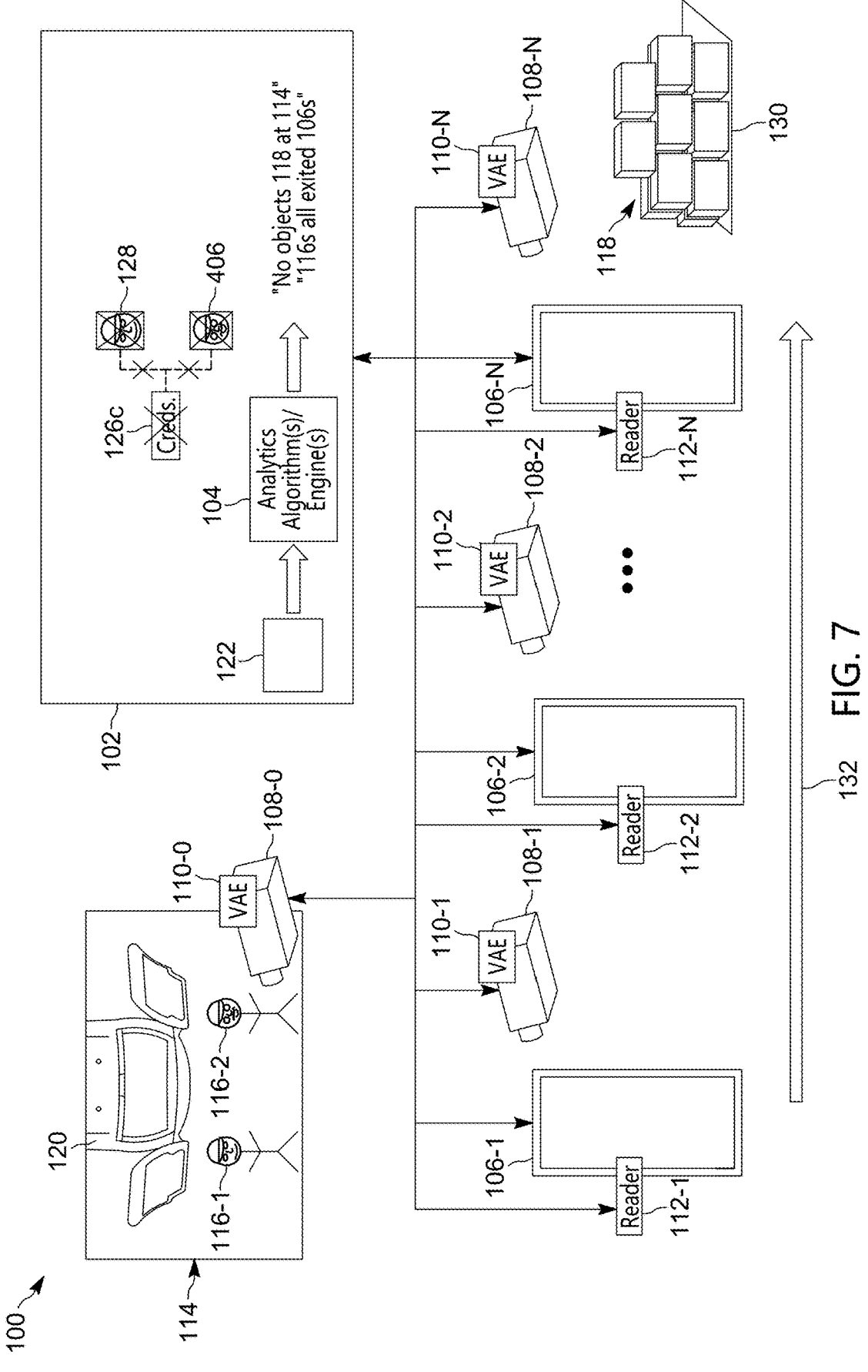
FIG. 7 depicts the system of FIG. 1 continuing to implement a method for controlling access control points, in accordance with some examples.

In particular, attention is next directed to FIG. 7, which depicts all the objects 118 at the particular location 130 and none of the objects 118 located at the area 114. Furthermore, the users 116 have returned to the area 114.

The computing device 102 continues to input the images 122 into the one or more analytics algorithms 104, and determines, using the one or more analytics algorithms 104 applied to the images 122 (e.g., including the images 122-1), that none of the objects 118 remain at the area 114, and the users 116 have returned to the area 114. Such a determination is depicted in FIG. 7 by way of the one or more analytics algorithms 104 outputting respective text "No Objects 118 At 114", and "116s All Exited 106s" however any suitable indications that none of the objects 118 remain at the area 114, and the users 116 have returned to the area 114, are within the scope of the present specification.

In response to determining that none of the objects 118 remain at the area 114, and the users 116 have returned to the area 114, the computing device 102 may responsively delete the copy of the credentials 126c and/or the images 128, 406 and/or the computing device 102 may remove an association between the copy of the credentials 126c and at least the image 406, though, as depicted, the computing device 102 may remove an association between the copy of the credentials 126c and both the images 406. In FIG. 7, the possible deletion of the copy of the credentials 126c and/or the images 128, 406, and/or associations therebetween, is depicted as a respective "X" through the copy of the credentials 126c, the images 128, 406, and the broken lines showing the association therebetween.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot unlock and/or open access control points from a distance, cannot verify electronic credentials, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, via at least one computing device, from a first access control point, valid user credentials associated with a first user, and responsively controlling the first access control point to allow entry therethrough for the first user;
   receiving, via the at least one computing device, from one or more cameras, images that depict the first user, a second user, and a plurality of objects;
   determining, via the at least one computing device, using one or more analytics algorithms applied to the images, that the first user is transporting a first object of the plurality of objects, and that the plurality of objects are detectably associated with each other;
   determining, via the at least one computing device, using the one or more analytics algorithms applied to the images, that the second user is transporting a second object of the plurality of objects;
   determining, via the at least one computing device, using the one or more analytics algorithms applied to the images, that the second user is at or is approaching the first access control point; and
   responsively controlling, via the at least one computing device, the first access control point to allow entry therethrough for the second user based on extended application of the valid user credentials to the second user.

2. The method of claim 1, further comprising,
   determining, using the one or more analytics algorithms applied to the images, that the second user is associated with the first user; and
   associating the valid user credentials with the second user only when: the second user is transporting the second object of the plurality of objects; and the second user is associated with the first user.

3. The method of claim 1, further comprising:

determining, using the one or more analytics algorithms applied to the images, that the first user is at or is approaching a second access control point after entering the first access control point; and responsively controlling the second access control point to allow entry therethrough for the first user based on the valid user credentials.

4. The method of claim 1, further comprising:

determining, using the one or more analytics algorithms applied to the images, that the second user is at or is approaching a second access control point after entering the first access control point, the first user having been previously granted access to the second access control point based on the valid user credentials; and responsively controlling the second access control point to allow entry therethrough for the second user based on the valid user credentials.

5. The method of claim 1, further comprising:

determining, using the one or more analytics algorithms applied to the images, that the first user has exited the first access control point; and thereafter, determining, using the one or more analytics algorithms applied to the images, that the first user is transporting a third object of the plurality of objects, and that the first user is at or is approaching the first access control point; and responsively controlling the first access control point to allow entry therethrough for the first user.

6. The method of claim 1, further comprising:

determining, using the one or more analytics algorithms, a path of the first user from the first access control point to a particular location; and responsively controlling any access control points between the first access control point and the particular location to allow entry therethrough for the first user and the second user based on the valid user credentials, as the first user and the second user are respectively at or are approaching the access control points.

7. The method of claim 1, further comprising:

determining, using the one or more analytics algorithms applied to the images, that all of the plurality of objects have been transported through the first access control point, and that the first user and the second user have thereafter exited the first access control point; and revoking the valid user credentials.

8. The method of claim 1, further comprising:

determining, using the one or more analytics algorithms applied to the images, that all of the plurality of objects have been transported through the first access control point, and that the first user and the second user have thereafter exited the first access control point; and, disassociating the valid user credentials with the second user.

9. The method of claim 1, further comprising:

determining, using the one or more analytics algorithms applied to the images, that all of the plurality of objects have been transported through the first access control point, and that the first user and the second user have thereafter exited the first access control point; and, restricting access to the first access control point to the first user until the valid user credentials are again received from the first access control point.

10. The method of claim 1, wherein the one or more analytics algorithms applied to the images comprise one or more of:

one or more video analytics algorithms applied to the images; and one or more metadata analytics algorithms applied to metadata associated with the images, the one or more cameras comprising one or more respective video analytics algorithms that: analyze respective images to identify one or more of the first user, the second user, and the plurality of objects in the respective images; and add identifiers of one or more of the first user, the second user and the plurality of objects to respective metadata of the respective images.

11. A device comprising:

a controller; and a computer-readable storage medium having stored thereon program instructions that, when executed by the controller, causes the controller to perform a set of operations comprising:

receiving, from a first access control point, valid user credentials associated with a first user, and responsively controlling the first access control point to allow entry therethrough for the first user;

receiving, from one or more cameras, images that depict the first user, a second user, and a plurality of objects;

determining, using one or more analytics algorithms applied to the images, that the first user is transporting a first object of the plurality of objects, and that the plurality of objects are detectably associated with each other;

determining, using the one or more analytics algorithms applied to the images, that the second user is transporting a second object of the plurality of objects;

determining, using the one or more analytics algorithms applied to the images, that the second user is at or is approaching the first access control point; and responsively controlling the first access control point to allow entry therethrough for the second user based on extended application of the valid user credentials to the second user.

12. The device of claim 11, wherein the set of operations further comprises, determining, using the one or more analytics algorithms applied to the images, that the second user is associated with the first user; and associating the valid user credentials with the second user only when: the second user is transporting the second object of the plurality of objects; and the second user is associated with the first user.

13. The device of claim 11, wherein the set of operations further comprises:

determining, using the one or more analytics algorithms applied to the images, that the first user is at or is approaching a second access control point after entering the first access control point; and responsively controlling the second access control point to allow entry therethrough for the first user based on the valid user credentials.

14. The device of claim 11, wherein the set of operations further comprises:

determining, using the one or more analytics algorithms applied to the images, that the second user is at or is approaching a second access control point after entering the first access control point, the first user having been previously granted access to the second access control point based on the valid user credentials; and responsively controlling the second access control point to allow entry therethrough for the second user based on the valid user credentials.

15. The device of claim 11, wherein the set of operations further comprises:

determining, using the one or more analytics algorithms applied to the images, that the first user has exited the first access control point; and thereafter, determining, using the one or more analytics algorithms applied to the images, that the first user is transporting a third object of the plurality of objects, and that the first user is at or is approaching the first access control point; and responsively controlling the first access control point to allow entry therethrough for the first user.

16. The device of claim 11, wherein the set of operations further comprises:

determining, using the one or more analytics algorithms, a path of the first user from the first access control point to a particular location; and responsively controlling any access control points between the first access control point and the particular location to allow entry therethrough for the first user and the second user based on the valid user credentials, as the first user and the second user are respectively at or are approaching the access control points.

17. The device of claim 11, wherein the set of operations further comprises:

determining, using the one or more analytics algorithms applied to the images, that all of the plurality of objects have been transported through the first access control point, and that the first user and the second user have thereafter exited the first access control point; and revoking the valid user credentials.

18. The device of claim 11, wherein the set of operations further comprises:

determining, using the one or more analytics algorithms applied to the images, that all of the plurality of objects have been transported through the first access control point, and that the first user and the second user have thereafter exited the first access control point; and, disassociating the valid user credentials with the second user.

19. The device of claim 11, wherein the set of operations further comprises:

determining, using the one or more analytics algorithms applied to the images, that all of the plurality of objects have been transported through the first access control point, and that the first user and the second user have thereafter exited the first access control point; and, restricting access to the first access control point to the first user until the valid user credentials are again received from the first access control point.

20. The device of claim 11, wherein the one or more analytics algorithms applied to the images comprise one or more of:

one or more video analytics algorithms applied to the images; and one or more metadata analytics algorithms applied to metadata associated with the images, the one or more cameras comprising one or more respective video analytics algorithms that: analyze respective images to identify one or more of the first user, the second user, and the plurality of objects in the respective images; and add identifiers of one or more of the first user, the second user and the plurality of objects to respective metadata of the respective images.

\* \* \* \* \*